Jan. 5, 1937.  A. T. PADAVIC, JR  2,066,694
SAFETY LICENSE TAG FASTENER
Filed Nov. 26, 1935  2 Sheets-Sheet 1
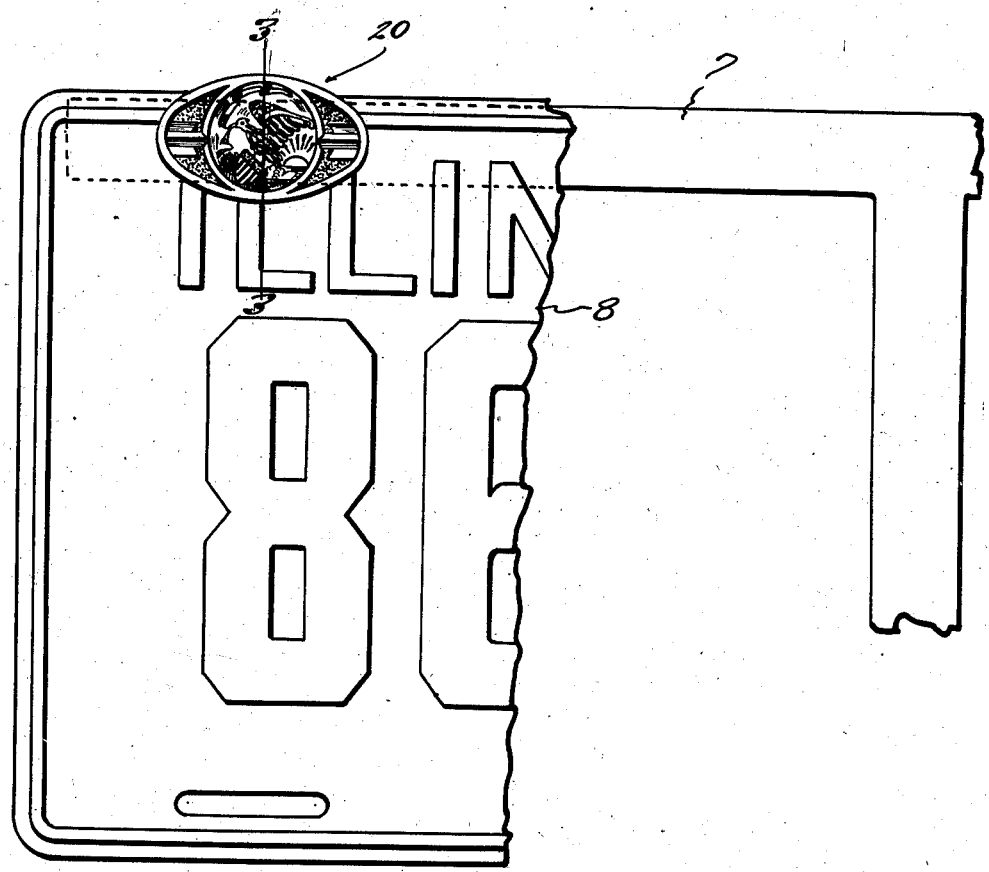
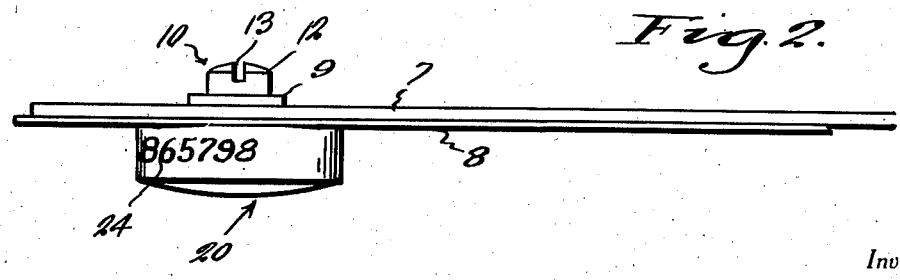
Inventor
Anton T. Padavic, Jr.
By Clarence A. O'Brien and Hyman Berman Attorneys

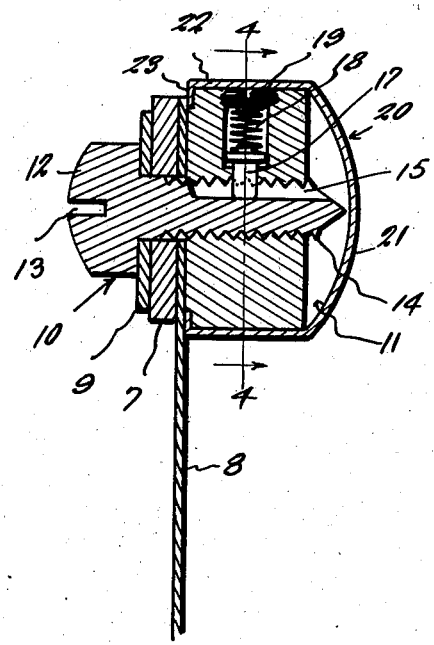
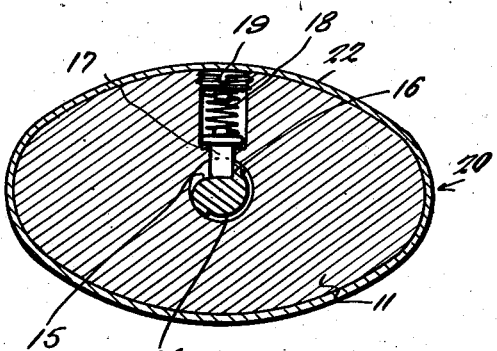
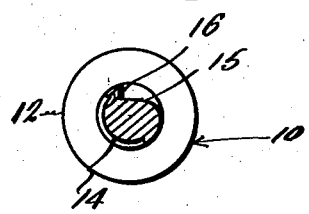
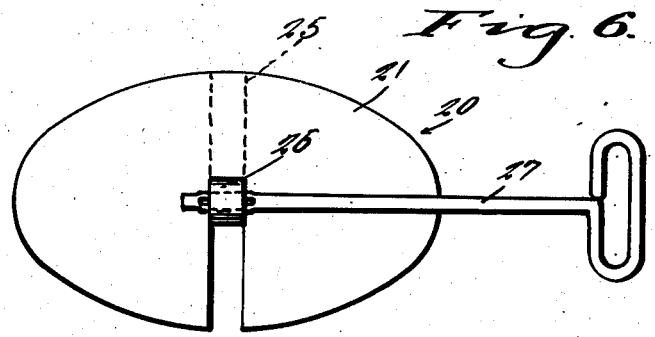

Patented Jan. 5, 1937

2,066,694

UNITED STATES PATENT OFFICE 2,066,694

SAFETY LICENSE TAG FASTENER

Anton T. Padavic, Jr., Quincy, Ill.

Application November 26, 1935, Serial No. 51,668

4 Claims. (Cl. 40—125)

The present invention relates to a structurally distinct locking type bolt and nut fastener of a style and form appropriately classifiable as a safety retention device for conventional license tags and plates used on present day motor vehicles and similar conveyances.

Needless to say, the special classified prior art to which fasteners of this type pertain is appreciably well developed and characterized by many varieties and forms of special fasteners. Being reasonably well conversant with the prior state of the art it is to be stated with requisite appropriateness that my chief aim is to provide a novel contribution to this particular line of endeavor wherein the structure selected is in keeping with desired simplicity, economy and efficiency, yet is structurally rare and characterized by worthy refinement and improvements.

Briefly stated, the preferred embodiment of the invention is characterized by a bolt expressly designed to accommodate a special spring pressed pawl equipped lock nut, said nut being utilized as a mounting or adapter for a disruptable tamper-proof seal possessed of sufficient merit to guard against illegal transference of automobile tags.

More explicitly comparative novelty is predicated upon a bolt and nut combination wherein the nut in conjunction with its protective covering or seal is ornamental but primarily constructed to permit unauthorized tampering to be easily and readily detected.

Other features and advantages will become more readily apparent from the following description and drawings.

In the drawings:

Figure 1 is a view showing a fragmentary portion of a license tag, the supporting bracket or fixture therefor, and illustrating the form and general character of the improved safety tag holder or fastening.

Figure 2 is a top or edge view of the assemblage shown in Figure 1.

Figure 3 is a vertical sectional view, on an enlarged scale, the section being taken on the plane of the line 3—3 of Figure 1.

Figure 4 is a vertical longitudinal sectional view taken on the plane of the line 4—4 of Figure 3.

Figure 5 is a cross-sectional view of the stem or shank of the unique bolt.

Figure 6 is a view showing a modified type of protective shell, partly in section, usable in connection with the locking nut illustrating how the same may be separated into quick detachable half-sections.

Referring first to Figures 1 to 3 inclusive it will be observed that the conventional fixture or hanger bracket is indicated by the numeral 7. The regulation or standard license plate or tag is indicated at 8. The special fastener assembly which is shown better in Figure 3 and which is designed to cooperate with these conventional parts 7 and 8 includes an appropriate washer 9 and a complemental bolt 10 and associated locking nut 11. The head 12 of the bolt is preferably provided with a screw-driver kerf 13. The shank or stem is provided with segmental screw threads 14 to co-act with the threads of the bore in the nut 11. As better shown in Figure 5, a portion of the periphery of the shank is cut away as indicated at 15 to define an outstanding keeper rib 16. This rib is in the nature of a cam and designed for appropriate co-action with the spring pressed latch or pawl 17. The pawl is in the nature of a pin which projects into the bore of the nut which is itself slidably mounted in a socket. An expansion spring 18 is arranged in the socket and held in place by a flat type screw 19. With this arrangement it is obvious that the nut can be turned on the bolt so as to effectively take hold of the shank to securely clamp the license tag on the hanger fixture. In other words, the nut can be turned home in one direction but cannot be rotated in a retrograde direction. This is due to the fact that the cam 16 permits the turning on one direction but prevents it turning in the opposite direction as is evidenced. In order to remove the pawl or latch pin 17 it is necessary to have access to the screw 19.

Normally the screw is protected and covered by a metallic housing or shell 20. Incidentally the nut as well as the housing may be ornamental, being here shown as of oval configuration. Moreover, the convexed outer portion of the shell as indicated at 21 may be suitably ornamented. As a general rule it is desired to use a Federal, State and Municipal seal of an official character. This is intended to add materially to the safety phase or factor of the invention. The rim of the shell as indicated at 22 is provided with a laterally directed marginal retention flange 23 fitting into a groove in the inner side of the marginal portion of the nut. It is securely clamped in place and prevents access being had to the removable plug screw 19. The only way that access can be had to this is to disrupt and remove the shell. In this sense the shell 20 may be unitarily and satisfactorily referred to as a disruptable seal. The appropriateness of this is evidenced when it is taken into consideration that part 20 is of a fragile or disruptable character. Any tampering therewith by unauthorized persons can be readily detected by the authorities.

It is evident that under oridanry circumstances the projecting convex wall 21 of the seal 20 may be punctured by a suitable instrument and with the aid of pliers or the like the complete nut enclosing shell can be literally turned off. This is necessary to make the usual annual legal exchange of tags. The State or other authority will provide, according to my ideas, each year a new complete seal with appropriate insignia and identification. In some instances the marginal rim 22 may be provided with legible numerals 24 corresponding to the tag number. This would make it all the more evident to authorities when the seal has been tampered with by unauthorized persons. In other words, this feature 24, together with the standardized insignia provides a sort of double check.

I have found it exceedingly practicable in some instances to provide the front wall 21 of the shell (see Figure 6) with a central scored or readily tearable central strip 25. This will be of a malleable character such as is used in the construction of certain commodity cans. Thus by providing a starting tab on the end of the tear-out strip, an end portion thereof as indicated at 26 may be wound around a suitable key 27 to separate the shell into half-sections in a conventional manner. Then the sections can be readily pryed off to permit access to be had to the nut and the spring-pressed pawl. This is believed to be an ingenious adaptation in a safety seal of the type under consideration.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the fields of invention claimed may be resorted to in actual practice, if desired.

Having thus described the invention what I claim is:—

1. As a component part of a fastener assemblage of the class described, a nut provided with a socket, a spring pressed locking pawl mounted in said socket, a plug screw threaded into the outer end of the socket, a disruptable metal protector shell substantially enclosing said nut, said shell having a rim portion completely surrounding and in direct contact with the periphery of the nut, a retention flange engaging one side of the nut, and a convex wall spaced from the corresponding face of the nut, said wall being adapted to carry identification means, and the marginal rim being adapted to carry identification data.

2. In a structure of the class described, a lock-nut provided with a spring pressed locking pawl, a protector shell substantially enclosing said nut and rendering said locking pawl inaccessible, said shell being divided by a malleable tear strip into quickly separable sections, said tear strip being constructed to accommodate a coiling and strip removing key to permit the shell to be separated into sections and to allow authorized removal from the nut to permit access to be had to the locking pawl.

3. As a component part of a fastener assemblage of the class described, a lock-nut provided in its periphery with a socket, a spring pressed locking pawl mounted for reciprocation in said socket, a plug screw threaded into the outer end of said socket and accessible on the peripheral rim of the nut, and a disruptable protector shell virtually enclosing said nut therein, the shell having a rim portion in direct contact with the rim of the nut to normally cover and render inaccessible said plug screw.

4. A fastener assemblage of the class described, comprising a nut provided with a locking means and a disruptable shell over said nut adapted to render said locking means inaccessible except by disrupting the shell, said shell having a malleable tear strip constructed to accommodate a coiling key, whereby the shell may be separated into quickly removable sections.

ANTON T. PADAVIC, Jr.